Patented Oct. 2, 1951

2,569,801

UNITED STATES PATENT OFFICE 2,569,801

PREPARATION OF AZLACTONES OF PHENYLACETAMINO ACRYLIC ACIDS

Elmer W. Cook, New York, N. Y., Edwin Oscar Hook, Old Greenwich, Conn., and Samuel Kushner, Nanuet, N. Y., assignors to American Cyanamid Company, New York, N. Y., a corporation of Maine No Drawing. Application February 12, 1947, Serial No. 728,202

1 Claim. (Cl. 260—307)

This invention relates to new organic compounds and to methods of preparing them. More particularly, the invention relates to the unsubstituted azlactone of phenylacetamino acrylic acid, and to compounds in which the beta carbon of the acrylic acid is substituted by sustituents which are convertible to, or reactible in lieu of, a hydroxy group under mild conditions, and include substances tautomeric with the formulas given.

Due to difficulties in proof of structure, of such compounds, it may be possible that certain of the crystalline forms are tautomers of the formulas given, but the compounds react as if they had the formulas specified.

Wherein used throughout this specification and claim, the terms and formulas used are intended to cover such tautomeric and allotropic forms of the named compounds.

The new compounds of the present invention may be represented by the following general formula:

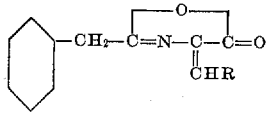

where R may be hydrogen, Br, Cl, —OCH₃, —OC₂H₅, —OCOCH₃, —SCH₃, —SC₂H₅, or —SCH₂C₆H₅.

The new compounds of our invention are particularly useful as intermediates in the preparation of other organic compounds, particularly certain ones which possess anti-biotic properties of the nature of these possessed by the penicillins.

As an example, if the constituent is methoxy, on the beta position in the acrylic acid, the compound might be called the azlactone of beta-methoxy phenylacetamino acrylic acid. The reaction product of this and beta mercapto valine (which is beta, beta dimethyl cysteine) gives a compound which when converted to its azlactone possesses certain of the properties of the penicillins.

The preparation of beta mercapto valine is discussed at greater length in the application of Beegle and Hook, Ser. No. 545,382, "Mercapto Compounds and Preparation of the Same," now abandoned.

Compounds other than beta mercapto valine and compounds prepared in accordance with our invention may be reacted together to obtain compounds which possess anti-biotic properties of a valuable nature but different than that possessed by the compounds resulting from reactions with beta mercapto valine.

The compounds of the present invention are prepared by treating alanine or a beta substituted alanine with phenylchloroacetyl chloride to obtain a compound which may be named N-phenylchloracetyl alanine, or as a beta substituted N-phenylchloracetyl alanine of the formula:

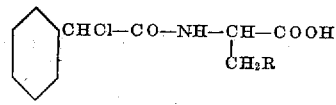

The constituent on the beta carbon atom of the alanine used determines the corresponding substituted product. These products as formed are then heated in the presence of acetic anhydride to obtain the product of our invention.

If the compounds are treated with acetic anhydride in the presence of pyridine an isomeric form is obtained, of a lower melting point, in some instances.

The azlactones are comparatively reactive compounds and must be treated carefully to prevent their decomposition. Warming with water or alcohol, especially in the presence of acid or base will open the ring or cause complete decomposition of the product.

The following equations show certain of the reactions involved in the production of the azlactones. Names for certain of the compounds are shown under their formulas. Where the nomenclature herein used differs therefrom, the name used in the monograph "The Chemistry of Penicillin," Hans T. Clarke et al., Princeton University Press, Princeton, N. J. 1949, is shown in brackets under certain of the structural formulas.

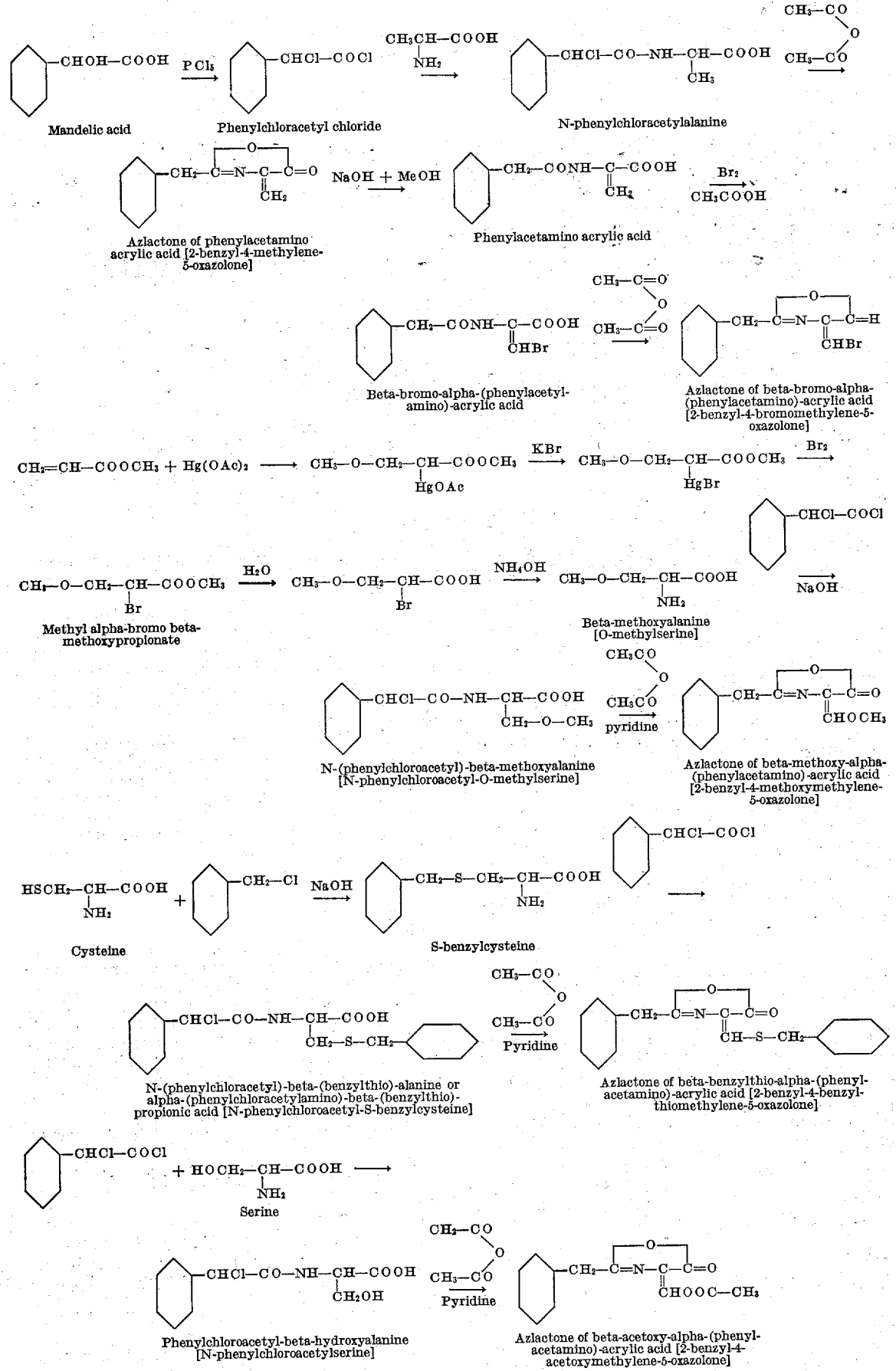

Specific examples follow:

EXAMPLE I

Mandelic acid was treated hot with phosphorous pentachloride in theoretical proportions to obtain phenylchloracetylchloride which was purified by distillation. Ten parts of d,l-alanine were dissolved in 100 parts of water, 7.8 parts of commercial 85% potassium hydroxide added and stirred slowly in a Dry Ice bath until partial crystallization occurred. To the mixture was added simultaneously from two separate sources, in small portions, 21.2 parts of phenylchloracetyl chloride and 7.8 parts of potassium hydroxide of 85% purity previously dissolved in 25 parts of water. These materials were added over a period of approximately 20 minutes. The material was stirred for an additional 25 minutes while still being cooled in the Dry Ice bath and then allowed to stand for 12 hours at room temperature. The material was extracted with ether and the extracted aqueous solution was added in small portions to iced concentrated hydrochloric acid. An oil was obtained which was washed with water, and after solidifying, was air dried. 17.8 parts were obtained, the crystals having a melting point of from 122° to 149° C. The great melting point range is ascribed to the fact that both the d and l forms were used. (If the resolved forms are used, compounds are obtained with a much sharper melting point.) The material obtained is phenylchloracetyl d,l-alanine. 20 parts of the phenylchloracetyl alanine thus formed was added to 200 parts of acetic anhydride, heated on a steam bath for five minutes, then cooled in ice. The acetic anhydride was removed at a low temperature by distillation in a vacuum produced by an oil pump (approximately $\frac{1}{10}$ mm. Hg). Crystals of the azlactone of phenylacetomina acrylic acid were obtained when most of the acetic anhydride had been removed.

If pyridine is used with the acetic anhydride, a crystalline modification is obtained with a melting point of 107° C.

EXAMPLE II

*The azlactone of phenylacetylamino acrylic acid*

A mixture of 30 parts of N-phenylchloro-acetyl alanine obtained as above and 30 parts of acetic anhydride was heated on a steam cone for 25 minutes. A clear rich yellow solution resulted. The acetic anhydride was removed with an oil pump, using a water bath at a temperature of 40° C. The resulting solid was triturated with 100 cc. of n-butanol and filtered. 16.9 grams of crystals were obtained having a melting point of 123–129°. 1.3 g. of additional product was obtained by evaporating the butanol giving a total yield of 79%. The compound when recrystallized from benzene showed a melting point of 128–132°. On analysis the compound was found to contain:

Calculated for $C_{11}H_9O_2N$: C=70.6; H=4.8; N=7.5. Found: C=71.4; H=5.0; N=7.3.

EXAMPLE III

*N-phenylchloroacetylalanine*

162 parts of d,l alanine were dissolved in 200 parts water containing 125 parts of 85% potassium hydroxide. To this stirred solution cooled to partial solidification in a Dry-Ice-acetone bath was added simultaneously over a period of 45 minutes 340 parts phenyl chloroacetyl chloride and 125 parts of 85% potassium hydroxide in 400 parts of water. After 12 hours at room temperature the solution was extracted with ether and the aqueous layer was added to an excess of iced dilute hydrochloric acid. The free acid came down as a gum which solidified upon scratching, 331 parts were obtained. Upon washing with cold benzene, 310 parts of white crystals were separated, melting at 130–160° C. Upon analysis the compound was found to contain:

Analysis calc'd for $C_{11}H_{12}O_3NCl$: N=5.8, Cl=14.7. Found: N=6.1; Cl=14.9.

EXAMPLE IV

*Hydrolysis of the azlactone of N-phenylacetyl amino acrylic acid to phenyl acetamide*

A mixture of 1 g. of azlactone from Example II and 4 cc. of a 2 N sodium hydroxide were dissolved in 40 cc. of ethyl alcohol and refluxed for one hour. The reaction mixture was concentrated to 10 cc. under suction on a steam cone and diluted with 20 cc. of water. The solution was filtered, acidified with hydrochloric acid, saturated with ammonium sulfate and extracted with ether. The ethereal extract was evaporated and the resulting oil crystallized from ether and petroleum ether. 2 g. of white nacreous plates were obtained which showed a melting point of 152–156° C. The product proved to be phenylacetamide with a melting point of 152–156° C. with the formula:

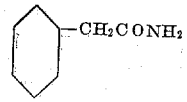

EXAMPLE V

*Phenylacetaminoacrylic acid*

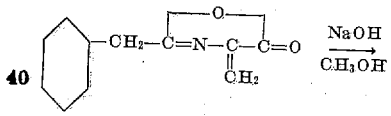

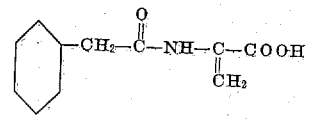

To a solution of 5 parts of the recrystallized azlactone of Example II in 250 parts of methyl alcohol was added 70 parts of the 0.87 N-sodium hydroxide solution. A reddish-brown color developed which quickly disappeared. After approximately 48 hours at room temperature the methanol was removed, the residue was precipitated with dilute hydrochloric acid, and 415 parts, a yield of 80%, of phenylacetaminoacrylic acid was obtained. The calculated neutral equivalent is 205 and the value obtained was 200.

EXAMPLE VI

*β bromo α (phenylacetylamino) acrylic acid*

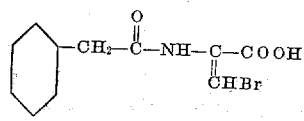

To a solution of 44 parts of phenylacetylamino acrylic acid, obtained as in Example V, in 1000 parts of chloroform was added over a period of 5 minutes 11 parts of bromine in 300 parts chloroform. After bringing the chloroform to a boil, acetone was added and to this a portion of a 90 to 100° fraction petroleum ether. The acetone was boiled off and 29 parts of the bromo acid was obtained, melting at from 173–175° with decomposition. The product may also be properly named as α(bromomethylene) phenaceturic acid.

EXAMPLE VII

*The azlactone of β bromo α (phenylacetylamino) acrylic acid*

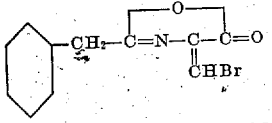

A mixture of 63 parts of the acid obtained in Example VI was dissolved in 1500 parts of acetic anhydride on a steam cone and then concentrated to an oily solid by evaporation of the acetic anhydride. The residue was triturated with 1000 parts of petroleum ether and 100 parts of tertiary butanol. The crystalline needles were dissolved in hot benzene, treated with de-colorizing carbon, filtered and reconcentrated. On cooling feathery needles separated which had a melting point of 165–167°. The crystals were the azlactone of β bromo α(phenylacetylamino) acrylic acid. Upon analysis the compound was found to contain:

Analysis calc'd for $C_{11}H_8O_2NBr$: C=49.6; H=3.1. Found for azlactone: C=49.3; H=3.7.

EXAMPLE VIII

*α(Phenylacetylamino) acrylic acid*

Ten parts of the recrystallized azlactone from Example II was suspended in 150 parts of cold methanol and 35.5 parts of 1.504 N-sodium hydroxide added gradually with stirring. The azlactone readily dissolved as the alkali was added. As each drop of the alkali was added the solution turned to chocolate brown but soon faded to colorless. After standing for 3 hours the solution was evaporated to dryness in a vacuum desiccator. The residue was dissolved in water and treated with absorbent charcoal. The solution was cooled and made acid to Congo red by dilute hydrochloric acid. The product at first oiled out but crystallized upon further cooling and stirring. A yield of 82.2 parts or 80% of the theoretical was obtained, the melting point of the crude product being 115–117° C. When dried in vacuo in an Abderhalden apparatus at the temperature of boiling benzene the melting point rose to 204° C. showing that a hydrate had originally been formed. It is difficult to recrystallize the phenylacetamino acrylic acid from the usual organic solvents but it may be dissolved in a warm glacial acetic acid and reprecipitated by the addition of water.

EXAMPLE IX

*Beta-bromo alpha phenylacetamino acrylic acid*

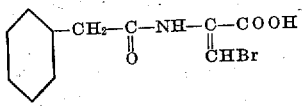

Bromine adds to phenylacetamino acrylic acid to form a dibromo derivative, but the latter readily loses HBr to form the unsaturated monobromo compound.

Three grams of phenylacetamino acrylic acid from Example VIII was dissolved in 30 cc. glacial acetic acid and treated gradually in the cold with a 0.75 cc. bromine. After standing at room temperature for 3 hours, the HBr and acetic acid were removed under reduced pressure at a temperature not exceeding 45° C. The crude product crystallized on the addition of cold water.

The material was purified by dissolving in dilute sodium hydroxide and reprecipitated with dilute hydrochloric acid. A yield of 3.3 g. approximately 80% theoretical was obtained, with a melting point of 175–177° C. A neutral equivalent of 277 was obtained as compared with a theoretical of 284.

EXAMPLE X

*The azlactone of beta-bromo phenylacetamino acrylic acid*

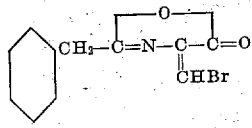

One gram of the acid from Example IX was heated on the steam bath for one hour with 20 cc. of acetic anhydride and the solution evaporated under reduced pressure. The crystalline residue was recrystallized from benzene giving a yield of .7 g. or 75% of theoretical of the azlactone of beta-bromo phenylacetamino acrylic acid with a melting point of from 152–154° C. Upon analysis the compound was found to contain: Carbon= 50.42; 50.29; hydrogen=3.69; 3.68; 3.66; bromine=26.75; 26.70.

EXAMPLE XI

*N-(phenylchloroacetyl)-beta-methoxyalanine*

β-Methoxy, d,l-alanine was prepared by the conventional method of treating acrylic ester with mercuric acetate to obtain the β-methoxy α-mercuric acetate double salt which in turn was treated with potassium bromide and then bromine giving α-bromo β-methoxy propionic ester which was hydrolyzed in turn with sodium hydroxide to get the free acid and the free acid converted to the alpha-amino acid by the use of ammonia.

24 grams of the β-methoxy d,l-alanine thus formed was dissolved in 150 cc. of water containing 8 g. of sodium hydroxide. The solution was stirred and cooled in an ice bath while from separate funnels, simultaneously, was gradually added 38 grams of phenylchloroacetyl chloride and a solution of 8 g. of sodium hydroxide in 50 cc. of water, the pH being maintained slightly on the alkaline side at all times. After stirring for 45 minutes at room temperature the solution was decolorized with absorbent charcoal and then filtered. The solution was acidified until acid to Congo red, with diluted hydrochloric acid whereupon the product came out as an oil which crystallized upon standing and chilling. The product was dried in a vacuum desiccator over phosphorus pentoxide giving an almost white crystalline product which melted at 170–172° C.

EXAMPLE XII

*The azlactone of β-methoxy phenylacetamino acrylic acid*

Ten g. of the phenylchloroacetyl beta methoxy d,l-alanine from Example XI was added to a mixture of 100 cc. of acetic anhydride and 30 cc. pyridine previously cooled in an ice bath. By occasional shaking, the solid soon dissolved, and was allowed to stand in the refrigerator for 48 hours. The reaction mixture was added to 1000 g. cracked ice and stirred for 30 minutes. By this time, most of the azlactone had precipitated but the whole mixture was extracted three times with trichlorethylene. The extract was washed successively with iced dilute hydrochloric acid and iced dilute sodium bicarbonate. After drying over sodium sulfate and plaster of Paris, the extract was evaporated under reduced pressure at a bath temperature not over 50° C. The gummy residue was dissolved in twice its volume of benzene and, on standing in the cold, beta-methoxy phenylacetamino acrylic acid azlactone crystallized. After separating this fraction, a second crop was obtained on concentrating by placing in a vacuum desiccator. A total crude yield was obtained of 8 g. By recrystallizing from benzene, 4.5 g. of product melting at 87–89° C. was obtained, representing 56% of the theoretical yield. Anal. Calc'd for $C_{12}H_{11}O_3N$: C=66.4%; H=5.06%; N=6.45%. Found: C=66.28, 66.34; H=5.23, 5.16; N=6.44, 6.70.

EXAMPLE XIII

*N-(phenylchloracetyl) beta methylthioalanine*

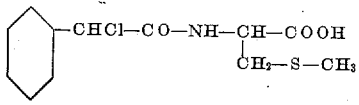

8 g. of S-methyl cysteine was dissolved in 50 cc. of water and 9 cc. 6 N sodium hydroxide. The solution was cooled and stirred during the simultaneous gradual addition of 9.5 g. phenylchloracetyl chloride and 9 cc. 6 N sodium hydroxide. After reacting an additional 30 minutes at room temperature, the solution was treated with decolorizing carbon, then acidified to Congo red. A precipitate oiled out which did not crystallize on standing. The product was dissolved in trichloroethylene, dried, and the solvent removed by vacuum. The oil formed was used in the next example.

EXAMPLE XIV

*Beta-methylthio phenylacetylamino acrylic acid azlactone*

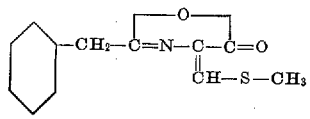

10 g. of the phenylchloracetylamino beta methylthio propionic acid from the preceding example was added to a cooled mixture of 100 cc. acetic anhydride and 30 cc. pyridine. After standing 6 hours in the refrigerator, the mixture was poured into 500 cc. of ice water. 30 minutes later the mixture was extracted three times with trichloroethylene. The extract was washed with cold dilute hydrochloric acid and then cold dilute sodium bicarbonate, dried over sodium sulfate, and the solvent removed in vacuo. The gummy product did not crystallize on standing and chilling.

EXAMPLE XV

*Phenylchloracetyl beta-hydroxy alanine*

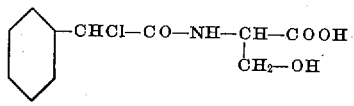

Serine (7.7 g.) was dissolved in 50 cc. water and 12.5 cc. 6 N sodium hydroxide. The solution was cooled and stirred during the simultaneous gradual addition of 13.8 g. phenylchloracetyl chloride and 12.5 cc. 6 N sodium hydroxide. After stirring 30 minutes at room temperature, the solution was decolorized with charcoal, then made acid to Congo red. The crystals of phenylchloracetyl beta-hydroxy alanine separating out were dried over phosphorus pentoxide in a desiccator, and had a melting point of 120–135° C. but sintered at 100° C.

EXAMPLE XVI

*Phenylacetylamino beta-acetoxy acrylic acid azlactone*

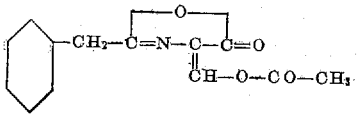

One gram of alpha-phenylchloracetylamino beta-hydroxy propionic acid from the preceding example was dissolved in a cold mixture consisting of 10 cc. acetic anhydride and 3 cc. of pyridine. After standing 3 hours in a refrigerator, the mixture was poured into 150 cc. of ice water. A purplish grey precipitate of the azlactone of phenylacetylamino beta-acetoxy acrylic acid was formed, the crystals melted at about 50° C. after being dried in a desiccator. It is to be noted that the acetic anhydride served both as a condensing and acylation agent.

Other substituents may be used on the alanine, as for example beta-ethoxy, may be used, under conditions strictly analogous to those given for the methoxy. Similarly chlorine may be used in place of bromine, although not as conveniently because it is a gas, and is less active. Similarly, instead of alanine, or serine, other compounds may be used in which other beta substituents are present on the alanine, with corresponding azlactones being formed. For example, the thio compounds may be used, as ethylthio, or benzylthio, instead of the methylthio of Examples XIII and XIV, from suitable starting materials. The reactions are the same, the compounds are of the same general class, and will react as a replaceable group in the beta position. The thio compounds are more difficult to crystallize, and usually separate as a gum.

The compounds formed in accordance with this invention may be reacted with cysteine or beta-mercapto valine to form alpha (2-(4-carboxy) thiazolidinyl) phenaceturic acid and alpha (2-(4-carboxy 5,5-dimethyl) thiazolidinyl) phenaceturic acid respectively. If other substituents are present on the beta carbon atom of the cysteine, corresponding 5 substituents appear on the final acid. The azlactones of these final acids exhibit antibiotic properties.

We claim:

The process of preparing an azlactone of beta-methoxy-phenylacetamino acrylic acid which comprises dissolving phenylchloroacetyl - beta-methoxy alanine in acetic anhydride and pyridine at a temperature of approximately 0° C., allowing to stand while cool until dissolved, and adding the mixture to cracked ice, extracting with trichlorethylene, washing with iced dilute hydrochloric acid and iced dilute sodium bicarbonate, drying, and evaporating the solvent at a reduced pressure at a temperature not over 50° C., adding to the residue approximately twice its volume of benzene, cooling, and recovering therefrom beta-methoxy-phenylacetamino acrylic acid azlactone, melting at approximately 87 to 89° C.

ELMER W. COOK.
EDWIN OSCAR HOOK.
SAMUEL KUSHNER.

(References on following page)

REFERENCES CITED

The following references are of record in the file of this patent:

UNITED STATES PATENTS

| Number | Name | Date |
|---|---|---|
| 2,489,881 | Harris et al. | Nov. 29, 1949 |

OTHER REFERENCES

OSRD Report, Winthrop Chemical Co. (W-5), pages 1 to 3, June 19, 1944.

OSRD Report, Cornell University (D-4), pages 1 to 5, February 3–March 15, 1944.

OSRD Report, Merck and Co. (M-10), pages 8 and 9, January 31, 1944.

OSRD Report, Michigan University (B-1), page 3, February 16, 1944.

Du Vigneaud, "Science," vol. 104, pp. 431–433 and 450 (November 8, 1946).

Merck, C. M. R., M-10, page 7 (January 31, 1944).

Upjohn, C. M. R., U, 11 at page 6, Report of July 10 to August 10, 1944.

Certificate of Correction

Patent No. 2,569,801 — October 2, 1951

ELMER W. COOK ET AL.

It is hereby certified that error appears in the printed specification of the above numbered patent requiring correction as follows:

Column 1, line 34, for "these" read *those*; column 4, the third line of the formulas, for

read column 5, line 39, for "phenylacetomina" read *phenylacetamino*; and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*